United States Patent [19]
Brandenburg

[11] 3,753,838
[45] Aug. 21, 1973

[54] APPARATUS FOR PRODUCING DOUBLE FACED CORRUGATED PAPERBOARD

[75] Inventor: Helmut Brandenburg, Wuppertal-Ronsdorf, Germany

[73] Assignee: Gebr. Eickhoff, Maschinenfabrik Und Eisengiesserei m.b.H., Bochum, Germany

[22] Filed: Feb. 17, 1972

[21] Appl. No.: 227,120

[30] Foreign Application Priority Data

Feb. 22, 1971 Germany............. P 21 08 378.3

[52] U.S. Cl.................. 156/555, 100/154, 156/470, 156/548, 156/580, 156/583
[51] Int. Cl............................................. B31f 1/20
[58] Field of Search.................... 156/462, 470–473, 156/548, 552, 553, 580, 583, 555; 100/154

[56] References Cited
UNITED STATES PATENTS 3,676,268   7/1972   Brandenburg et al. ............. 156/548
2,993,527   7/1961   Moser et al......................... 156/555

*Primary Examiner*—Daniel J. Fritsch
*Attorney*—Thomas H. Murray et al.

[57] ABSTRACT

Apparatus in which a flat paper facing sheet is glued to a traveling corrugated paper sheet is provided with an endless traveling belt, the lower strand of which rests on an upper facing sheet. Resting on this lower strand of the belt is a plurality of weighting rolls arranged in rows extending lengthwise of the belt. Above each row of rolls there is a beam to which the rolls are pivotally connected. Each beam is adjustable vertically independently of the others in order to adjust the pressure of the rolls against the belt. The beams are prevented from moving lengthwise.

9 Claims, 9 Drawing Figures

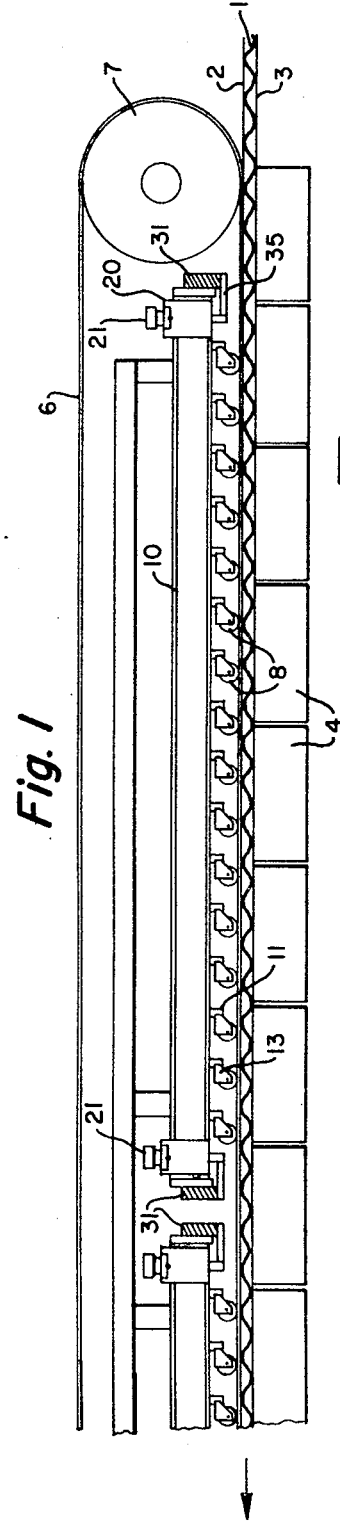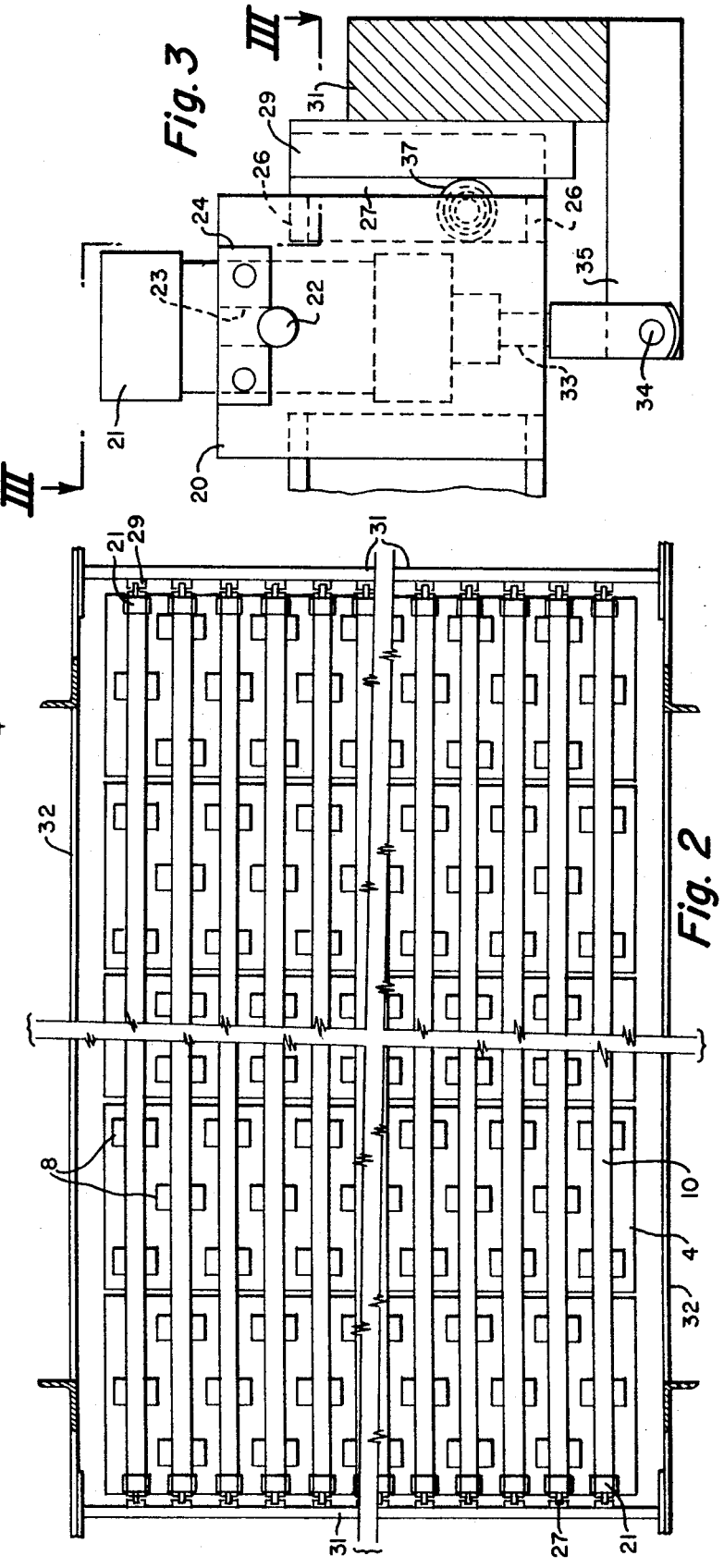

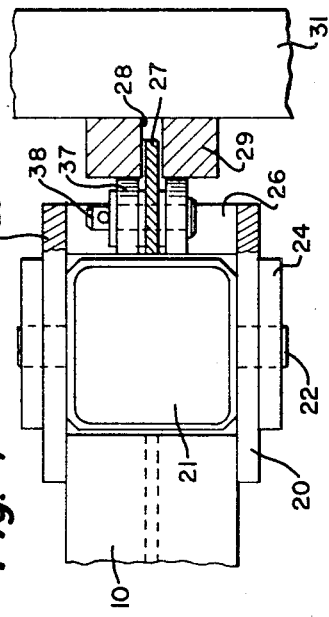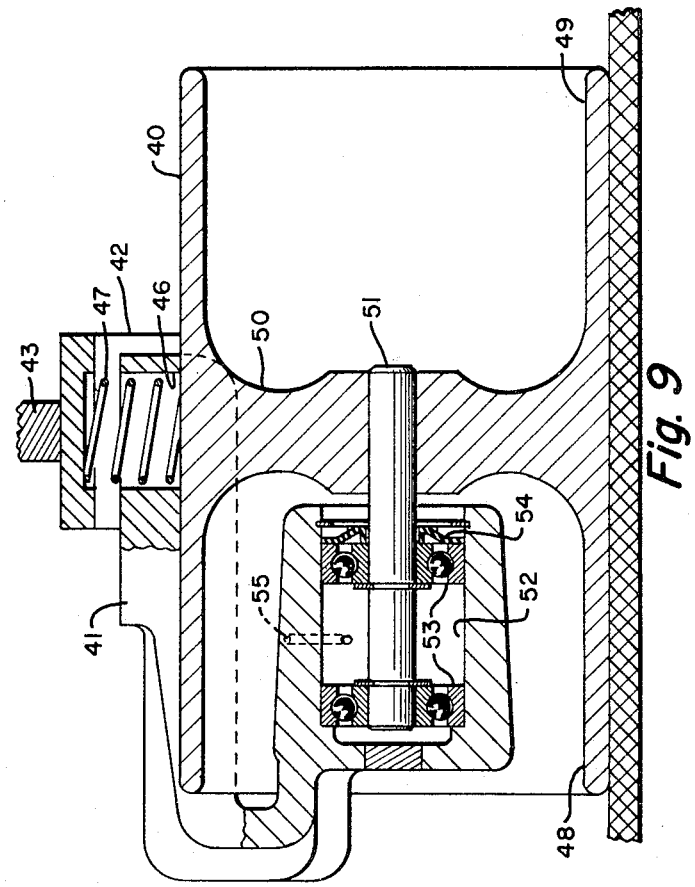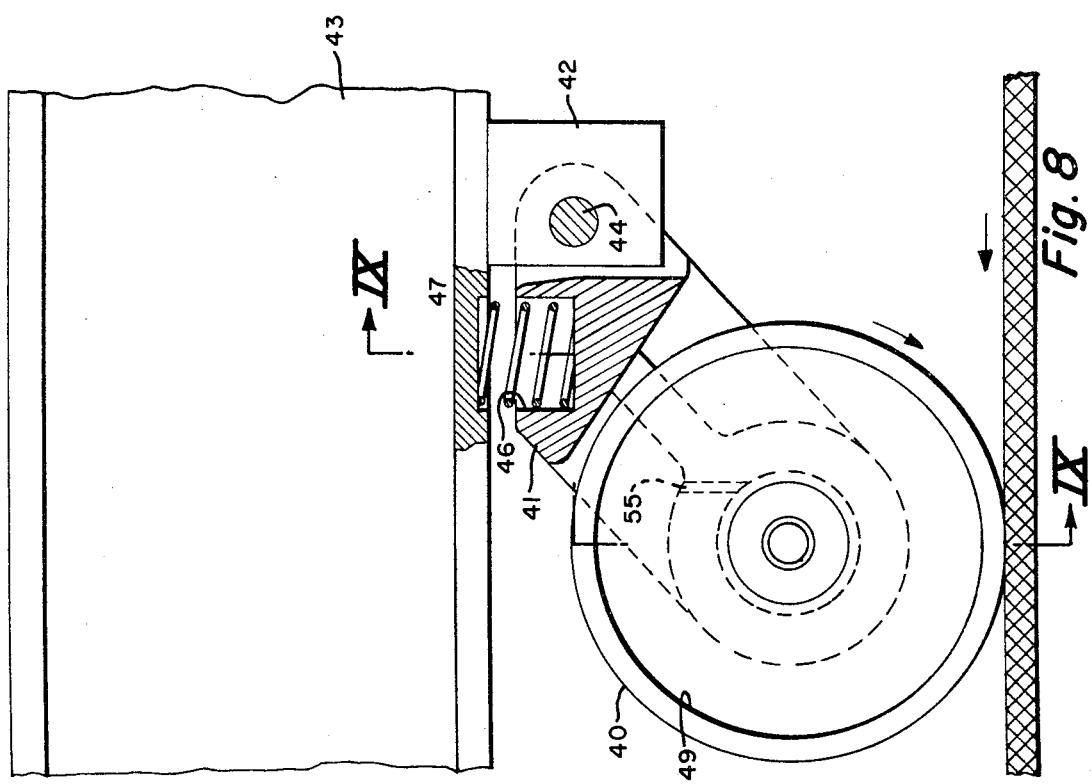

APPARATUS FOR PRODUCING DOUBLE FACED CORRUGATED PAPERBOARD

In patent application Ser. No. 83,869, filed Oct. 26, 1970, now U.S. Pat. No. 3,676,268, a machine of the general character of the one described herein is disclosed. In that machine a corrugated paper strip or sheet is glued to the upper surface of a flat facing sheet that travels over heating units. The bottoms of the corrugations of the corrugated sheet are covered with an adhesive and rest on a lower flat facing sheet. To move the web forward continuously and hold the corrugations firmly against the lower sheet, an endless belt above the web has a lower strand that rests on and frictionally engages the upper facing sheet. To the weight of the belt itself are added individual weighting rolls that engage the upper surface of the lower strand of the belt. The rolls are mounted in a common support extending across the belt and are individually adjustable vertically or in groups by fluid pressure cylinders. The pressure of the belt against the web holds it firmly against the heating units as the glue sets.

It is among the objects of this invention to provide apparatus that is an improvement on the machine disclosed in the above-mentioned patent application, in that it requires a great many less fluid pressure cylinders, it supports the rolls in a more advantageous manner, and it permits a row of rolls as a unit to be adjusted vertically by a minimum number of cylinders or removed from the machine for guide replacement.

The preferred embodiment of the invention is illustrated in the accompanying drawings, in which FIG. 1 is a schematic side view;

FIG. 2 is an enlarged fragmentary plan view of the roll assembly without the belt;

FIG. 3 is an enlarged fragmentary side view of one end of one of the roll supports;

FIG. 4 is a plan view of FIG. 3;

FIG. 8 is a view similar to FIG. 5 of a modification; and

FIG. 9 is a vertical section taken on the line IX—IX of FIG. 8.

Figure 7:
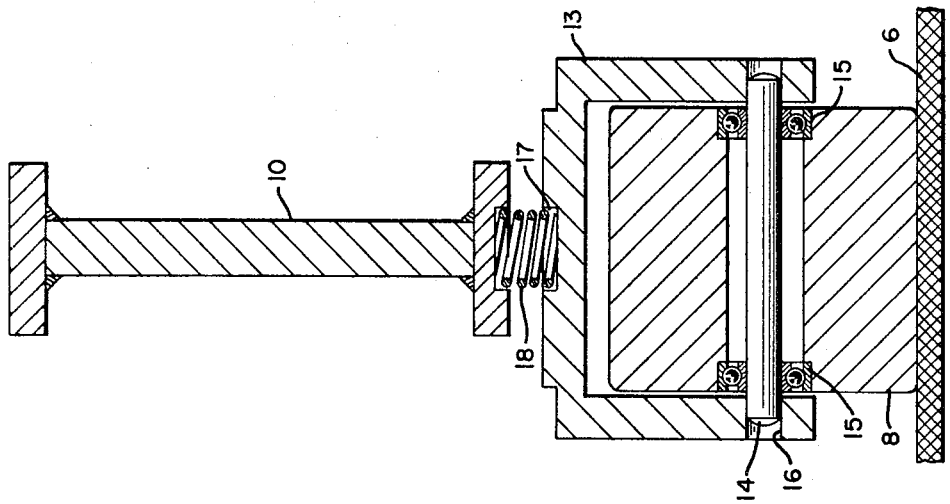
FIGS. 6 and 7 are vertical sections taken on the lines VI—VI and VII—VII, respectively, of FIG. 5.

Referring to FIG. 1 of the drawings, a traveling paper web, which may consist of a corrugated paper sheet or strip 1 between two flat paper facing sheets 2 and 3. Assuming that one of the facing sheets has already been firmly glued to the corrugated sheet, the latter and the other facing sheet are in the process of being glued together. The double faced corrugated paperboard strip is moved forward over a series of heating plates 4 that have flat upper surfaces, the purpose of which is to set the glue as rapidly as possible and to dry the sheets so that the new facing sheet will be securely bonded to the corrugated sheet.

In order to hold the web flat against the heating plates while the glue is setting, there is an endless traveling weighting belt 6 above the plates. This belt extends around a roller 7 journalled near each end of the series of heating plates. The belt has enough slack in it for its lower length or strand to press down on the upper facing sheet of the paperboard web and thereby reduce the time required for bonding and drying, as well as hold the facing strips flat. However, the weight of the belt alone cannot be depended upon to exert the desired even pressure against the strip, so pressure or weighting rolls 8 rest on the lower belt strand and hold it down firmly against the paperboard.

Figure 6:
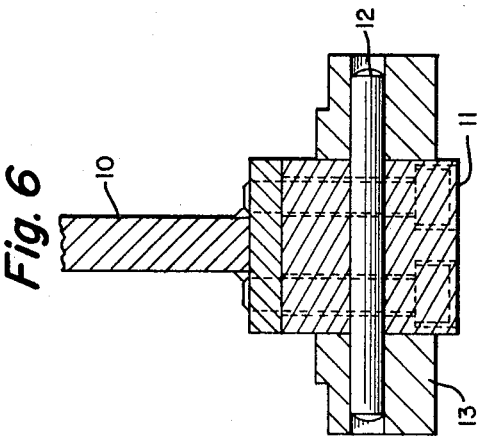
Figure 5:
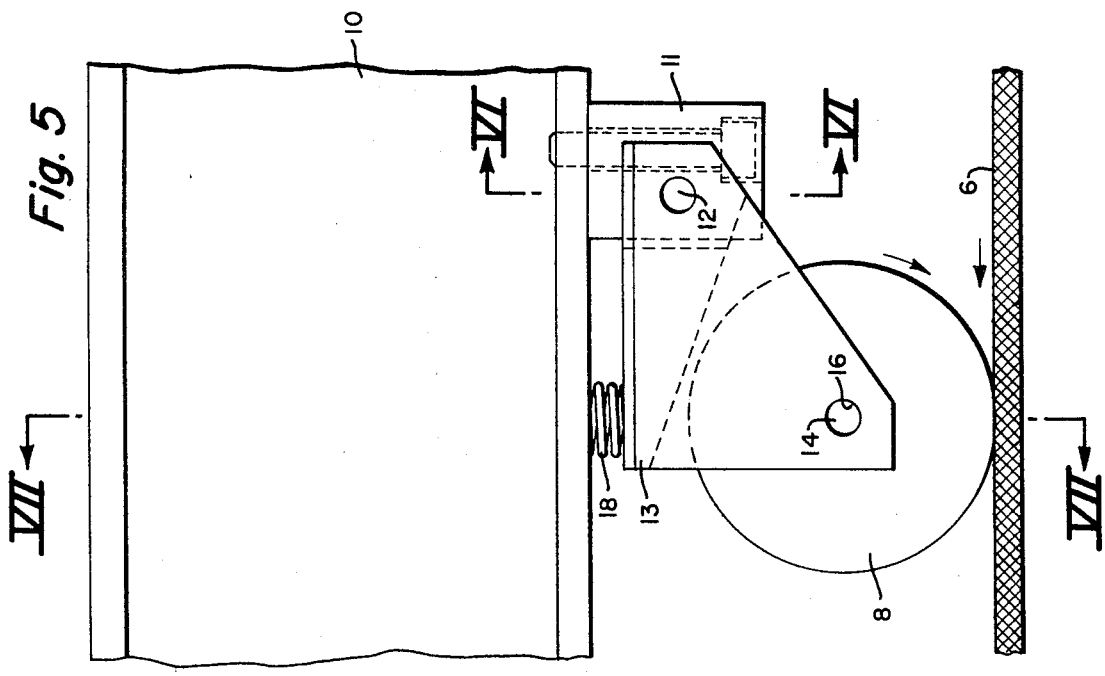
FIG. 5 is an enlarged side view of one of the rolls attached to its support.

In accordance with this invention and as shown in FIG. 2, the rolls are arranged in parallel rows extending lengthwise of the belt, the rolls in each row being staggered relative to those in the rows beside them. Each row of rolls is attached to and supported by a common beam 10 extending lengthwise of the belt. Therefore, there are as many beams as there are rows of rolls. To connect the rolls to a beam, the beam has a number of downwardly projecting bearing blocks 11 as shown in FIGS. 1, 5 and 6, through each of which a pivot pin 12 extends. Mounted on the projecting ends of each pin is the forked rear end (compared with the direction of travel of the paperboard web) of an arm 13 that extends forward from the block and down. The lower front end of the arm is bifurcated so that it can receive one of the rolls 8, through which a shaft 14 extends. The shaft is mounted in bearings 15 in the roll as shown in FIG. 7, and the ends of the shaft are disposed in aligned openings 16 in the opposite sides of the arm. The top of the front end of the arm is provided with a shallow socket 17, in which there is a coil spring 18 that is compressed between the arm and the bottom of the beam above it. This spring allows the roller to move upwardly relative to the beam in case an extra thickness, such as a splice in the belt, passes under the roll. Due to this upward movement of the roll the paperboard will not be marked, resulting in an especially smooth surface of the web.

The opposite ends of the various beams 10 are provided with spaced pairs of vertical plates 20 that extend lengthwise away from the beams. As shown in FIGS. 3 and 4, between each pair of plates there is a vertical double acting fluid pressure cylinder 21 provided with laterally projecting trunnions 22 that rest in the bottom of slots 23 formed in the upper ends of the plates. The trunnions are held in these slots by retaining bars 24 fastened to the plates. Between the top and bottom of the outer ends of each pair of plates 20 there are horizontal cross bars 26 that support a central vertical guide plate 27 projecting beyond the bars into a vertical slot 28 formed between a pair of vertical guide bars 29. They are secured to the side of a rigid cross member 31 that extends across the belt between its upper and lower reaches and that is supported at its ends by side members 32 of the frame of the apparatus. In each cylinder there is a piston provided with a rod 33 extending downwardly to a pivotal connection 34 with one end of a bar 35 secured to the bottom of the adjoining cross member 31.

When fluid pressure is delivered to the lower ends of cylinders 21 it will move the cylinders downwardly on the stationary pistons and thereby press the rolls more firmly against the belt to increase the pressure of the belt against the paperboard web. When fluid pressure is delivered to the upper ends of the cylinders, the beams will be raised to reduce the pressure of the rolls against the belt or even to lift them entirely away from it. At the front end of each beam 10 the vertical guide plate 27 supports a pair of rollers 37 on a horizontal pin 38. These rollers engage bars 29 so that the tendency of the beams to be moved forward by the traveling web or belt will not create friction that might interfere with vertical adjustments of the beams.

Since irregularities that occur in the web surface have the form of longitudinal strips that are at the center of the web at times and in the size zones at other times, the mounting of the rolls in the fashion disclosed herein is especially advantageous. Also, it allows the desired pressure distribution to be achieved with a minimum number of fluid pressure cylinders. With only two cylinders per beam, the pressure distribution along the length of the belt can be changed by depressing one end of the beam more than the opposite end. Thus, the pressure of the rolls against the belt can be increased from roll to roll in the direction of travel of the web, or it can be decreased from roll to roll. Also, if it becomes necessary to remove a damaged roll, its supporting beam can be quickly lifted out of the machine after disconnecting the piston rods at its opposite ends from bars 35, and quickly replaced.

In the modification shown in FIGS. 8 and 9, a weighting roll 40 is supported by the lower end of an arm 41 inclined downwardly from a block 42 attached to a supporting beam 43. The upper or rear end of the arm, like the one first described, is pivotally mounted on a pin 44 projecting from the opposite sides of the block. Directly in front of the block the top of the arm is provided with a recess 46, in which there is a coil spring 47 that is compressed against the bottom of the overlying beam. Instead of mounting the roll in a recess in the arm, the arm is provided with a laterally extending reverse bend as shown in FIG. 9, and the lower end of the arm extends into an axial recess 48 in one end of the roll. The opposite end of the roll is provided with a matching recess 49, the inner ends of the recesses being separated by a central radial web 50 integral with the roll. Rigidly mounted in this web is the inner end of a shaft 51 that extends outwardly into an axial socket 52 in the end portion of the arm within recess 48. The shaft is mounted in bearings 53 in the socket. The outer end of the socket is provided with a seal 54 for maintaining grease in the socket for the bearings. The bending moment which occurs, due to the overhung roll arrangement, is reduced by having the lower end of the arm extend into the roll in the manner disclosed.

To maintain the air pressure inside arm socket 52 substantially atmospheric in spite of increasing roll temperature, the side wall of the socket is provided with a ventilation passage 55 extending from the inside of the socket upwardly through the arm. The lower end of this passage is located between the bearings and at the side of the socket that is beside the downwardly moving side of the rotating shaft, so that lubricating grease in the socket will not be expelled through the ventilation passage by the pumping action or centrifugal force of the rotating shaft. The ventilation passage, by equalizing the air pressure at its opposite ends, avoids a situation in which the lubricant might be forced out of the arm socket past the seal.

I claim:

1. In apparatus for producing double faced corrugated paperboard, the combination with an endless traveling weighting belt having upper and lower strands, of a plurality of rows of weighting rolls resting on the lower strand of the belt, said rows extending lengthwise of the belt, a beam above each of said rows and extending lengthwise of it, means connecting each beam to the row of rolls beneath it, means for adjusting the beams vertically independently of one another to adjust the pressure of the rolls against the belt, and means restraining movement of the beams in other directions.

2. In apparatus according to claim 1, said adjusting means including fluid pressure cylinders connecting said restraining means and beams.

3. In apparatus according to claim 1, said restraining means including stationary cross members extending across said belt at the opposite ends of the beams, vertical guide members secured to said cross members, and guide means connected to the ends of the beams, said guide means and guide members being interconnected to permit only vertical movement of the guide means.

4. In apparatus according to claim 1, said restraining means including stationary cross members extending across said belt at the opposite ends of the beams, vertical guide members secured to said cross members, guide means connected to the ends of the beams, said guide means and guide members being interconnected to permit only vertical movement of the guide means, and anti-friction means carried by an end of each beam and engaging the adjoining guide member.

5. In apparatus according to claim 3, said guide members forming vertical slots open toward the beams, and said guide means including vertical plates slidably disposed in said slots.

6. In apparatus according to claim 3, said guide members forming vertical slots open toward the beams, said guide means including vertical plates slidably disposed in said slots, and rollers mounted on horizontal axes on said plates and engaging the adjoining guide members.

7. In apparatus according to claim 1, said connecting means including an arm pivotally connected at one end to each roll, means pivotally connecting the opposite end of the arm to the beam above it on an axis parallel to the roll axis, and a spring mounted between each arm and the overlying beam and resisting upward swinging of the arm.

8. In apparatus according to claim 7, each arm being pivotally connected to a roll by means of a shaft rigidly mounted in the roll and rotatably mounted in the arm.

9. In apparatus according to claim 8, each roll being provided with an axial recess extending inwardly from an end of the roll, one end of said shaft being rigidly mounted in the roll and extending into said recess, an arm extending laterally into the roll recess and provided with an axial socket, and spaced bearings mounted in said socket and receiving said shaft, the wall of the socket having a passage therein extending from a side of the socket upwardly through the arm between said bearings, and said passage being located at the side of the socket adjacent the side of said shaft that moves downwardly as the shaft rotates.

* * * * *